(12) United States Patent
Svede et al.

(10) Patent No.: US 11,582,218 B2
(45) Date of Patent: Feb. 14, 2023

(54) MANAGEMENT OF ACCESS CREDENTIALS

(71) Applicant: Charter Communications Operating, LLC, St. Louis, MO (US)

(72) Inventors: Jon Svede, St. Louis, MO (US); Colin B. Holm, St. Louis, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 341 days.

(21) Appl. No.: 16/901,942

(22) Filed: Jun. 15, 2020

(65) Prior Publication Data
US 2021/0392131 A1 Dec. 16, 2021

(51) Int. Cl.
*G06F 21/44* (2013.01)
*H04L 29/06* (2006.01)
*H04L 9/40* (2022.01)
*H04W 12/069* (2021.01)

(52) U.S. Cl.
CPC ........ *H04L 63/0807* (2013.01); *H04L 63/083* (2013.01); *H04L 63/108* (2013.01); *H04W 12/069* (2021.01)

(58) Field of Classification Search
CPC . H04L 63/0807; H04L 63/083; H04L 63/108; H04W 12/069
USPC ....... 713/156, 159, 164, 172, 175, 179, 168, 713/185; 726/2, 9, 10, 18, 19, 20, 27, 28, 726/29, 30
See application file for complete search history.

(56) References Cited

U.S. PATENT DOCUMENTS

| | | | |
|---|---|---|---|
| 11,277,415 B1 * | 3/2022 | Rinehart | H04L 63/068 |
| 2020/0007531 A1 * | 1/2020 | Koottayi | H04L 67/146 |

* cited by examiner

*Primary Examiner* — Izunna Okeke
(74) *Attorney, Agent, or Firm* — The Marbury Law Group, PLLC

(57) ABSTRACT

Various embodiments include computing devices and methods for management of access credentials. A processor of a computing device may receive an authentication request from a client application support service to authenticate a client application. The processor may send a response comprising an authentication token to the client application support service. The processor may receive from the client application support service a request for an access token to access a target system. The processor may send a response comprising the access token to the client application support service to enable the client application support service to access the target system using the access token on behalf of the client application.

24 Claims, 14 Drawing Sheets

MANAGEMENT OF ACCESS CREDENTIALS

BACKGROUND

Access tokens may be used in token-based authentication to allow an application to access an application programming interface (API). The application may receive an access token after a user successfully authenticates and authorizes access. The application may then pass the access token as a credential when calling the target API. The passed token informs the API that the bearer of the token has been authorized to access the API and perform specific actions, which may be specified by a scope that was granted during authorization.

Conventional systems for acquisition and management of authentication and authorization tokens present a single point of failure for applications to login to other applications. For example, developers may need to integrate with a system using a single shared credential. If the single credential is ever compromised, or a user causes a lockout, dependent applications will become inaccessible until the issue is resolved.

SUMMARY

Various aspects disclosed herein include methods that may be implemented on a processor of a computing device for management of access credentials. In some embodiments, the computing device may include a token management network element. Various embodiments may include receiving from a client application support service an authentication request to authenticate a client application, sending a response comprising an authentication token to the client application support service, receiving from the client application support service a request for an access token to access a target system application program interface (API), and sending a response comprising the access token to the client application support service to enable the client application support service to access the target system API using the access token on behalf of the client application. The client application may be executing on a device remote from the client application support service, such as a mobile device or a wireless device.

Some aspects may include determining whether an access token that is associated with the client application is found in a token store in response to the received request from the client application support service for the access token, and receiving the access token from the token store in response to determining that the access token that is associated with the client application is found. Some aspects may include receiving client application credentials from a database in response to determining that the access token that is associated with the client application is not found, sending to the target system a token request using the received client application credentials, and receiving from the target system an access token in response to the token request using the received client application credentials.

In some aspects, sending a response comprising the access token to the client application support service to enable the client application support service to access the target system including the access token on behalf of the client application may include sending a response comprising the access token received from the target system to the client application support service. In some aspects, the authorization request may include a username and a password. Some aspects may include retrieving from a token store the access token in response to the received request from the client application support service for the access token.

Some aspects may include determining a time to live (TTL) for the access token and associating the TTL with the access token. Some aspects may include determining that the TTL associated with the access token has expired, and sending to the target system an indication that the access token has expired. Some aspects may include determining that a credential associated with the client application, the authentication token, or the access token has been compromised; and performing a security operation in response to determining that the credential associated with the client application, the authentication token, or the access token has been compromised.

Various aspects further include a computing device having a processor configured with processor executable instructions to perform operations of any of the methods summarized above. Various aspects further include a processing device for use in a computing device and configured to perform operations of any of the methods summarized above. Various aspects include a computing device having means for performing functions of any of the methods summarized above. Various aspects include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
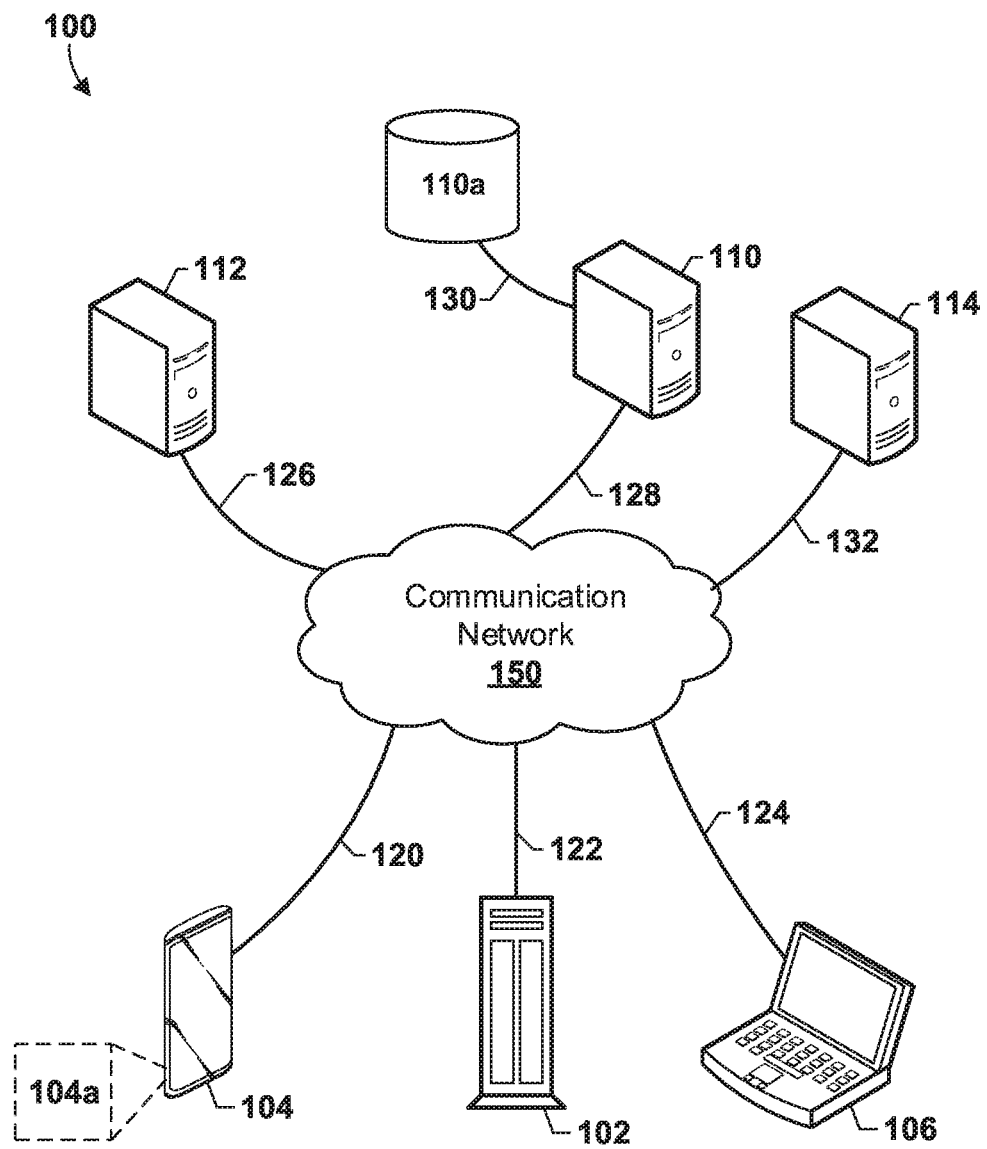
FIG. 1 is a system block diagram of a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of network elements such as servers, routers, set top boxes, head-end devices, and other similar network elements, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium.

Conventional systems for acquisition and management of authentication and authorization tokens present a single point of failure for applications to login to other applications. Conventional systems use a single shared credential, which represents a potential single point of failure. For example, if the single credential is compromised, or a user causes a lockout, for example, by entering an incorrect password a threshold number of times, applications whose functionality depends on access to services and systems by means of the single credential become inaccessible until the credential compromise, lockout, or other issue is resolved.

Various embodiments enable a network element of the system to retain and rotate a plurality of access credentials. Implementations of various embodiments remove the dependency of client applications on a single credential, making the client applications more resilient, more stable and more available. Various embodiments may not be specific to a particular target system or target API, but rather may enable management of access credentials that may be used on behalf of a client application to use, access, or request information from a variety of systems or services (referred to herein as a "target system").

In some embodiments, a computing device, such as a network element, may be configured to function as a token management system. The computing device may receive an authentication request from a client application support service. The client application support service may be implemented on a network computing device, and may serve as an intermediate device or function between a client application and the token management system, as well as between the client application and a target system. The authentication request may include, for example, credentials such as a username and password. The computing device may send a response to the client application support service. The response sent to client application support service may include an authentication token. In some embodiments, the computing device may perform one or more authentication processes or operations to authenticate the client application, and then may send a response including the authentication token to the client application support service in response to determining that the client application is authenticated.

In some embodiments, the computing device may receive a request for an access token from the client application to the client application support service. The requested access token may be used by the client application to the client application support service to access a target system (e.g., via a target system API) on behalf of the client application. In some embodiments, the computing device may send a response including the access token to the client application support service. The access token may enable the client application support service to access the target system. In some embodiments, the computing device may store a plurality of credentials, and may generate and provide any number of access tokens. In various embodiments, the system enables one or more sets of credentials to access a given target system, in effect decoupling a direct relationship between client application credentials and access tokens, and enabling the token management system and the client application support service to manage client application access to various target systems.

In some embodiments, the computing device may determine whether an access token that is mapped to the client application is found in a token store in response to receiving the request from the client application support service for the access token. In some embodiments, the computing device may receive (e.g., obtain, retrieve) the access token from the token store in response to determining that the access token that is mapped to the client application is found. In some embodiments, the computing device may retrieve the access token from a token store in response to receiving the request from the client application support service for the access token. Additionally or alternatively, in some embodiments, the computing device may randomly select an access token from among a pool of available access tokens, and may associate the available access token with the client application.

In response to determining that the access token that is mapped to the client application is not found, the computing device may receive client application credentials from a database. The computing device may send to the target system (e.g., via a target system API) a token request using the received client application credentials. The computing device may receive from the target system an access token in response to the token request using the received client application credentials. In some embodiments, the computing device may send a response that includes the access token to the client application support service to enable the client application support service to access the target system with the access token.

Various embodiments improve the operation of client application by handling target system authentication and target system access operations on behalf of, and transparent to, the client application. In most cases, after a client application support service initially logs in to a target system on behalf of the client application, the system may cache the client application's access token and/or authorization information, and the system continue to reuse the access token and/or authorization information to access the target system on behalf of the client application until either the client application logs out of the target system, or the token expires. By providing systems and methods to centrally create and manage tokens, client applications only need to know how to request a token from the token management system, and need not to be involved with authentication semantics for each target system.

Further, the computing device (e.g., the token management system) may be configured to control time to live (TTL) values for access tokens. For example, the usefulness of access tokens may be limited in time. However, in practice, many access tokens are provided with a very long TTL value (in some cases, as long as days, weeks, months, or even longer). By providing access tokens with such long time to live values, a client application may not be required to repeatedly authenticate to a target system. While such a practice may be convenient for the client system, this practice limits the security efficacy of the TTL value, and may even enable an attacker that has stolen credentials to use them for the period of the long TTL value. In some embodiments, the computing device may be configured to centrally monitor the TTL of various access tokens, and to render an access token unusable upon expiration of the access token's TTL.

In various embodiments, the computing device may be configured to manage token-to-credential mappings. The computing device may also be configured to enable the computing device, rather than a client application (or device on which a client application is executing), to control the supply and function of access tokens granted to particular client applications. Further, various embodiments improve the operation of client applications by removing the need for client applications to authenticate directly with target systems. Rather, client applications may simply request tokens from the computing device (e.g., the token management system), and client applications need not be provided, or utilize, authentication semantics and interactions with target systems.

In various embodiments, the computing device may be configured to store and manage a configurable number of credentials per target system. The computing device may be configured with a configurable TTL or access token expiration threshold. In some embodiments, the computing device may manage the TTL or access token expiration based on designated TTL semantics.

In various embodiments, the computing device may be configured to perform one or more security operations to protect the target system and/or the client application. In some embodiments, the computing device may determine that the authentication token, or the access token, or a credential associated with the client application has been compromised. The computing device may perform a security operation in response to determining that the credential associated with the client application, the authentication token, or the access token has been compromised.

Various embodiments may be implemented to provide a token management service. Various embodiments may be implemented to provide a framework that enables a client application support service to be integrated with the token management service. In some embodiments, the framework may provide an interface for making authenticated requests that automatically acquires an authentication token, refreshes the authentication token if needed, and may include the authentication token in requests (e.g., to source system APIs). In such embodiments, a client application support service that integrates with a source system API may be implemented to utilize the token management service. In some implementations, the framework may provide such functions or functional components as: a configurable client to make requests and parse requests from a token management system API; a component to store tokens (e.g., from the token management system) for re-use across multiple requests; a component to automatically refresh a token in response to determining that the token has expired or is invalid; and/or a component to tokens from the token management system in requests to source system APIs.

Various embodiments may be implemented within a variety of communication systems 100, an example of which is illustrated in FIG. 1. With reference to FIG. 1, the communication system 100 may include a set top box (STB) 102, a mobile device 104, a computer 106, network elements such as a computing devices 110, 112, and 114, and a communication network 150. The STB 102, the mobile device 104, the computer 106, and the computing devices 110, 112, and 114 may communicate with the communication network 150 via a respective wired or wireless communication link 120, 122, 124, 126 and 128. The computing device 110 may communicate with a data store 110a via a wired or wireless communication link 130.

The STB 102 may include customer premises equipment, which may be implemented as a set top box, a router, a modem, or another suitable device configured to provide functions of an STB. The mobile device 104 may include any of a variety of portable computing platforms and communication platforms, such as cell phones, smart phones, Internet access devices, and the like. The computer 106 may include any of a variety of personal computers, desktop computers, laptop computers, and the like.

The computing device 110 may be configured to perform operations of a token management system. The computing device 112 may be configured to perform operations of a target system. The computing device 114 may be configured to perform operations of a client application support service.

The STB 102, the mobile device 104, and the computer 106 may each include a processor or processing device that may execute one or more client applications (e.g., client application 104a). The client application 104a may send (via the mobile device 104) a call to the computing device 114. The call may include a request for information from, for example, a target system executing on, or available through, the computing device 112.

In various embodiments, the computing device 114 may send an authentication request to the computing device 110. The computing device 110 may access the data store 110a to determine whether an access token for the target system (e.g., 112) is stored in the data store 110a. In some embodiments, the computing device 110 may send to the computing device 114 a response including a token that is found in the data store 110a, or that is generated in response to the request, as further described below. The computing device 114 may send a message to the computing device 112 (e.g., the target system) using the token to request the information from the computing device 112 on behalf of the client application 104a. The computing device 112 may send a response message to the computing device 114 indicating a successful response (e.g., an HTTP Status Code 200), or an authentication failure if the token has expired (e.g., an HTTP Status Code 401). The successful response may be included with, or may be sent separately from, the information requested by the client application 104a. In response to receiving a successful response and the requested information, the computing device 114 may provide the requested information to the client application 104a. In response to receiving an authentication failure, the computing device 114 may send another message to the computing device 110 to obtain a new token.

The communication network 150 may support wired and/or wireless communication among the STB 102, the mobile device 104, the computer 106, and the computing devices 110 and 112. The communication network 150 may include one or more additional network elements, such as servers and other similar devices (not illustrated). The communication system 100 may include additional network elements to facilitate communication among the STB 102, the mobile device 104, the computer 106, and the computing devices 110 and 112. The communication links 120, 122, 124, 126, 128 and 130 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Wired communication protocols may use a variety of wired networks (e.g., Ethernet, TV cable, telephony, fiber optic and other forms of physical network connections) that may use one or more wired communication protocols, such as Data Over Cable Service Interface Specification (DOCSIS), Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

The wireless and/or wired communication links 120, 122, 124, 126, 128 and 130 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, 126, 128 and 130 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth standard, Bluetooth Low Energy (BLE), 6LoW-PAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
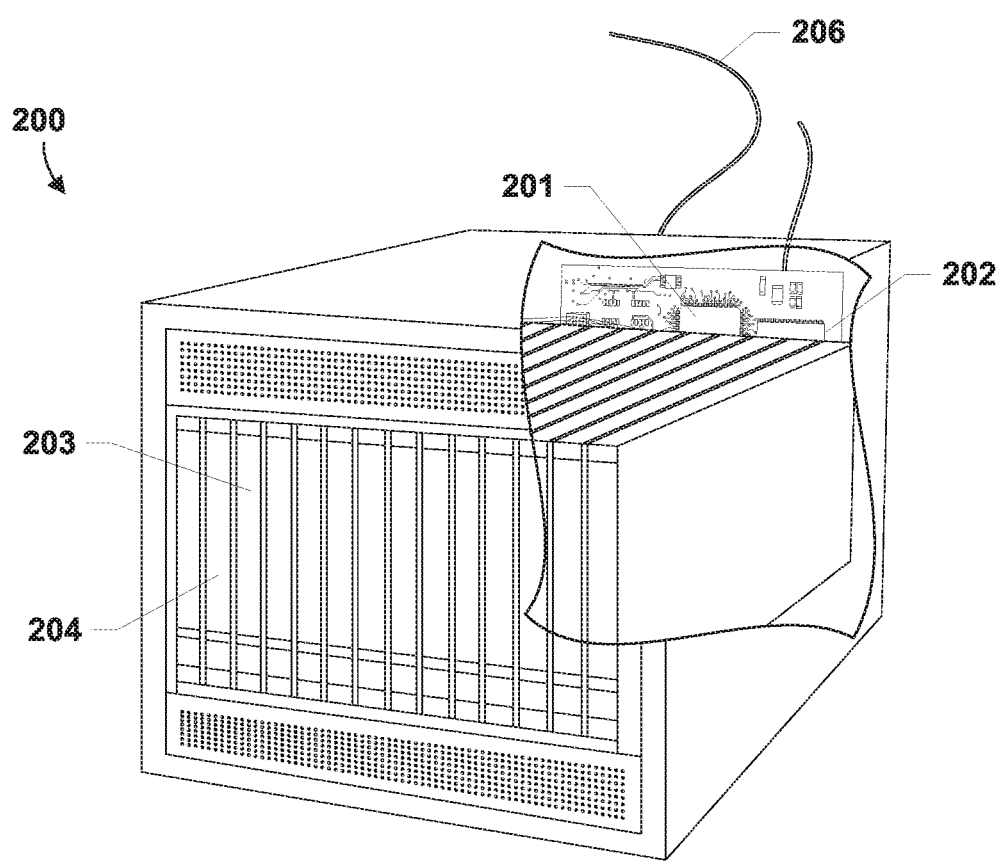
FIG. 2 is a component block diagram illustrating components of a network element suitable for implementing various embodiments.

Various embodiments may use a computing device as a server, router, or another suitable element of a communication network. Such network elements may typically include at least the components illustrated in FIG. 2, which illustrates an example network element 200. With reference to FIGS. 1 and 2, the network element 200 (e.g., the computing devices 110 and 112) may include a processor 201 coupled to volatile memory 202 and a large capacity nonvolatile memory, such as a disk drive 203. The network element 200 may also include a peripheral memory access device such as a floppy disc drive, compact disc (CD) or digital video disc (DVD) drive 204 coupled to the processor 201. The network element 200 may also include network access ports 206 (or interfaces) coupled to the processor 201 for establishing data connections with a network, such as the Internet and/or a local area network coupled to other system computers and servers. Similarly, the network element 200 may include additional access ports, such as USB, Firewire, Thunderbolt, and the like for coupling to peripherals, external memory, or other devices.

Figure 3:
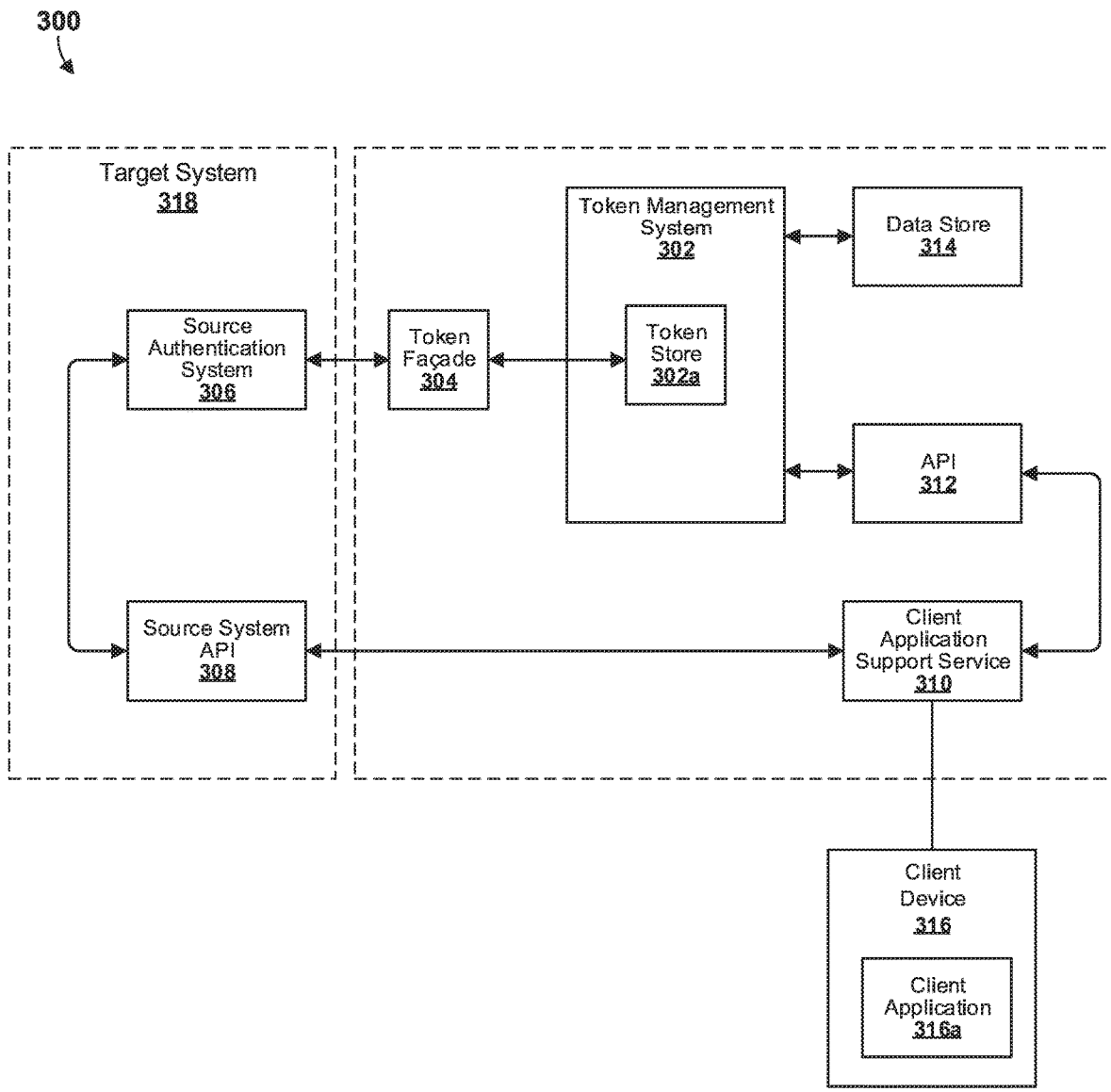
FIG. 3 is a component block diagram illustrating components of a network architecture suitable for implementing various embodiments.

FIG. 3 is a component block diagram illustrating components of a network architecture 300 suitable for implementing various embodiments. With reference to FIGS. 1-3, the network architecture 300 may include a token management system 302 and a client application support service 310 that may access the token management system 302 via an API 312 on behalf of a client application 316a (e.g., FIG. 1, 104a) executing on a client device 316 (e.g., FIG. 1, 102, 104, 106). The network architecture 300 may also include a target system 318 that includes a source authentication system 306 and a source system API 308. In some embodiments, the token management system 302 and the client application support service 310 may be elements of a back-end system that provides authentication services and information via a communication network (e.g., the communication network 150, FIG. 1) for the client application 316a.

A token management system 302 may include a token store 302a (see e.g., FIG. 1, in storage device 110a). The token management system 302 may be implemented on a network element (e.g., 110). The token management system 302 may obtain an access token from a source authentication system 306 of a target system 318 via a corresponding token façade 304. In some embodiments, a token façade 304 may provide an interface and a set of functions through which the token management system 302 may obtain access tokens from the source authentication system 306. In some embodiments, the token façade 304 may encapsulate and abstract login semantics so that the token management system 302 does not need to receive or process semantics for any given target system 318. The token management system 302 may store obtained access tokens in the token store 302a. The token management system 302 may store configuration information in an encrypted format (e.g., encrypted at rest) in a data store 314 (e.g., a database or another suitable data structure). The data store 314 also store data such as username and password, a user friendly name (e.g., a name that is easily readable by a user), authentication URLs, API URLs, and/or other suitable information. In some embodiments, the token management system 302 may be provided with an API in a designated format, such as a representational state transfer (REST) API, to facilitate request of an acquisition of tokens.

The token management system 302 may perform authentication procedures to enable access to the target system 318 on behalf of the client application 316a. For example, the client application 316a may send a request for information to the client application support service 310 via the client device 316. The client application support service 310 may interact with the token management system 302 via the API 312. Among other things, the client application support service 310 may send an authentication request (which may include client application credentials, such as a username and password or other suitable credentials) to the token management system 302 via the API 312. The token management system 302 may perform procedures to authenticate the client application 316a with the target system 318 (e.g., via the source authentication system 306), and may store the client application credentials in memory (see e.g., FIG. 1, in external storage device 110a or in the internal token store 302a).

The client application support service 310 may interact with the target system 318 through a source system API 308. For example, the client application support service 310 may send requests and information to the source system API 308 on behalf of the client application 316a. An initial message or request from the client support service 310 to the source system API 308 may include an access token obtained by the client application support service 310 from the token management system 302. The source system API 308 may provide the access token to the source authentication system 306, and the authentication system 306 may authenticate the client application 316a and/or the request on the basis of the presented access token. Thereafter, the client application support service 310 may interact with (e.g., send messages to and receive messages from) the target system 318 via the source system API 308.

In various embodiments, the network architecture 300 may enable application-to-application communication. As one example of an implementation of the network architecture 300, the client application 316a may include a mobile geo-tracking application (e.g., executing on the client device 416a) such as may be used to track the location of a user when jogging, riding a bicycle, or the like. The geo-tracking application may call the services of a geolocation SaaS (software as a service) component (e.g., executing on the target system 318) via an API (e.g., the API 308). In some implementations, the geo-tracking application may be required to login to the geolocation service to use the service. In some implementations, the geolocation service may be exposed as a RESTful service via the API. In this example, when the mobile application (geo-tracking application) executes on the client device, the client application 316a may send a message to the client application support service 310 to request information from the geolocation service from time to time (e.g., every 15-30 seconds). The client application support service 310 may handle authentication operations with the token management system 312 and the target system 318 on behalf of the client application 316a in a manner that the authentication operations are not visible to (i.e., are transparent to) the client application 316a. For example, while the client application 316a may send a message to the client application support service 310 requesting the geolocation information from the geolocation service executing on the target system 318, and the client application 316a may ultimately receive the geolocation information from the target system 318 via the client application support service, the client application 316a is not involved in login operations or authentication operations to authenticate the client application 316a to the target system 318. Rather, the client application support service 310 handles the login operations and authentication operations on behalf of the client application 316a.

Figure 4:
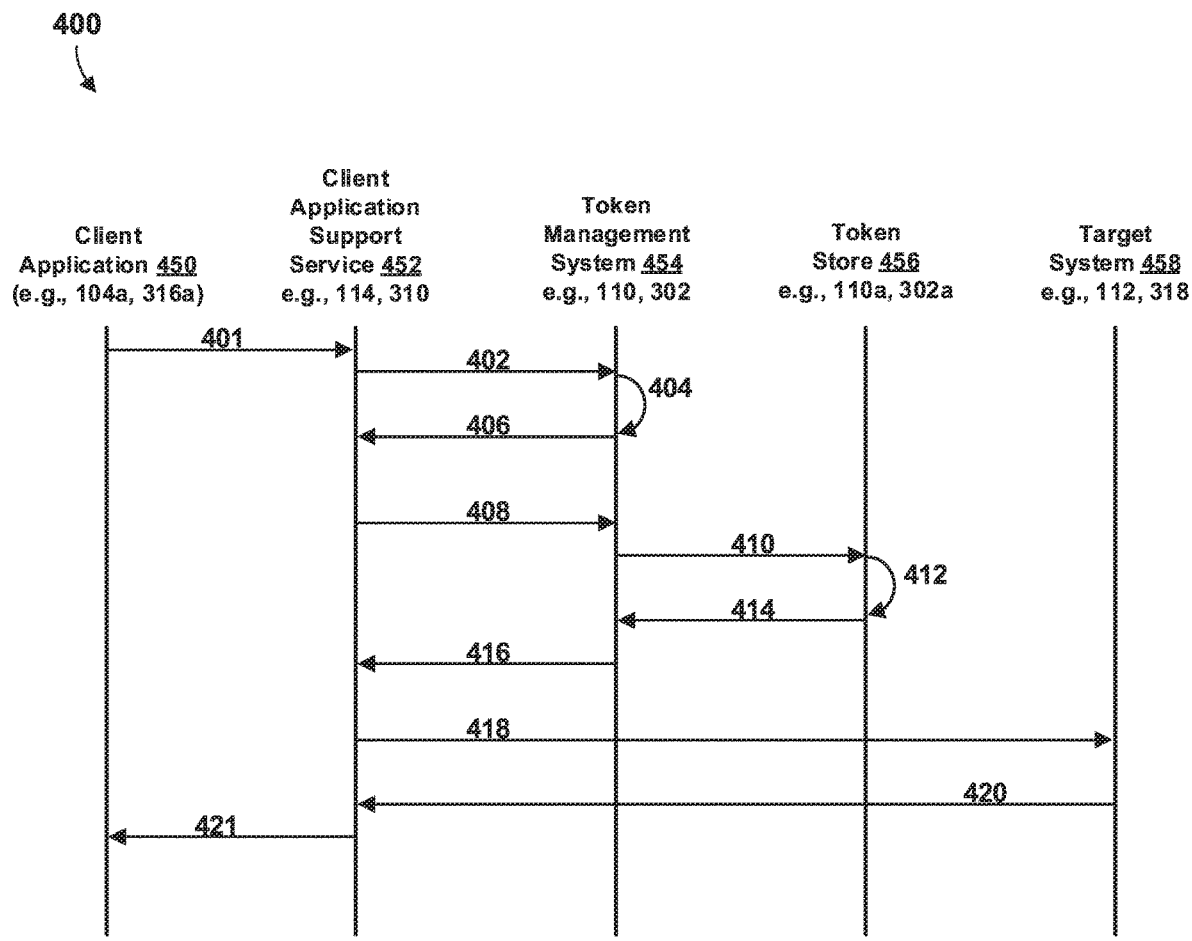
FIGS. 4-7 are message flow diagrams illustrating methods for management of access credentials according to various embodiments.

FIG. 4 is a message flow diagram illustrating a method 400 for management of access credentials according to various embodiments. With reference to FIGS. 1-4, the method 400 illustrates that a client application support service 452 (e.g., 114, 310) may request an access token from a token management system 454 (e.g., 110, 302) via a credential management API (e.g., API 312) on behalf of a client application 450 (e.g., 104a, 316a). In this scenario, the client application support service 452 merely requests an access token for a target system 458 (e.g., 112, 318) via the credential management API. The client application 450 may have no information about whether the token exists. Further, the client application 450 may not interact with the target system to obtain the access token.

In some embodiments, the client application 450 may send a request 401 for information from the target system 458 to the client application support service 452. The client application support service 452 may send an authentication request 402 to the token management system 454 to authenticate the client application 450 with the token management system 454. The client application support service may send the authentication request 402 via a credential management API (e.g., the API 312). The token management system 454 may perform authentication operations 404, and via the credential management API may return a response 406 including an authentication token to the client application support service 452 in response to authenticating the client application 450.

The client application support service 452 may then send a token request 408 to the token management system 454. The token request 408 may include a request for an access token for the target system 458 (e.g., using an identifier of the target system). The token request 408 may include a credential name or credential ID. The token request 408 may request the access token based on the credential name or credential ID. In some embodiments, the credential name may include a user-friendly name that is easily understood by a user (e.g., a name of a company, a person, etc.). In some embodiments, the credential ID may be assigned by the system and used to identify the credential and tokens uniquely.

The token management system 454 may send a query 410 to a token store 456 (e.g., 110a, 302a) to determine whether an access token for the target system 458 is stored in the token store 456 in operation 412. In response to determining that the access token is stored in token store 456 (i.e., in response to determining that the token has been created for the client application 450 with respect to the target system 458), the token store 454 may send a message 414 including the access token to the token management system 302 (e.g., via the credential management API 312). The token management system 454 may then send a message 416 including the access token to the client application support service 452. Additionally or alternatively, in some embodiments, the token management system 302 may randomly select an access token from among a pool of available access tokens, and may associate the selected access token with the client application 310.

In some embodiments, the token management system 454 may store one or more access tokens that have been previously obtained from a target system (e.g., 458) in the token store 456. For example, in anticipation that one or more client applications (e.g., 450) may request an access token for the target system 458, the token management system 454 may obtain access token(s) for the target system 458 and store the obtained access tokens in the token store 456. In some embodiments, the token management system 454 may store a token (or tokens) obtained for a client application 450, and may send the stored token to the client application support service 452 upon request from the client application support service 452 (i.e., on behalf of the client application 450). In some embodiments, the token management system 454 may obtain an access token from a target system 458 in response to receiving a request from the client application support service 452 for an access token for the target system 458.

Using the provided access token, the client application support service 452 may send a call message 418 (e.g., a message, a request for access, a request for information, or another suitable message) to the target system 458. In response to the call message 418, the target system 458 may provide a response message 420 to the client application support service 452, and the client application support service 452 may provide information from the response message 420 to the client application 450 in a message 421. For example, the message 421 may include information responsive to the request 401 for information.

In this manner, the client application support service 452 may obtain access to the target system 458 using the access token that was received from the token management system 302 instead of directly from the target system 458. Further, the authentication operations and the interactions among the client application support service 452, the token management system 454, and the target system 458 are not visible to the client application 450.

Figure 5:
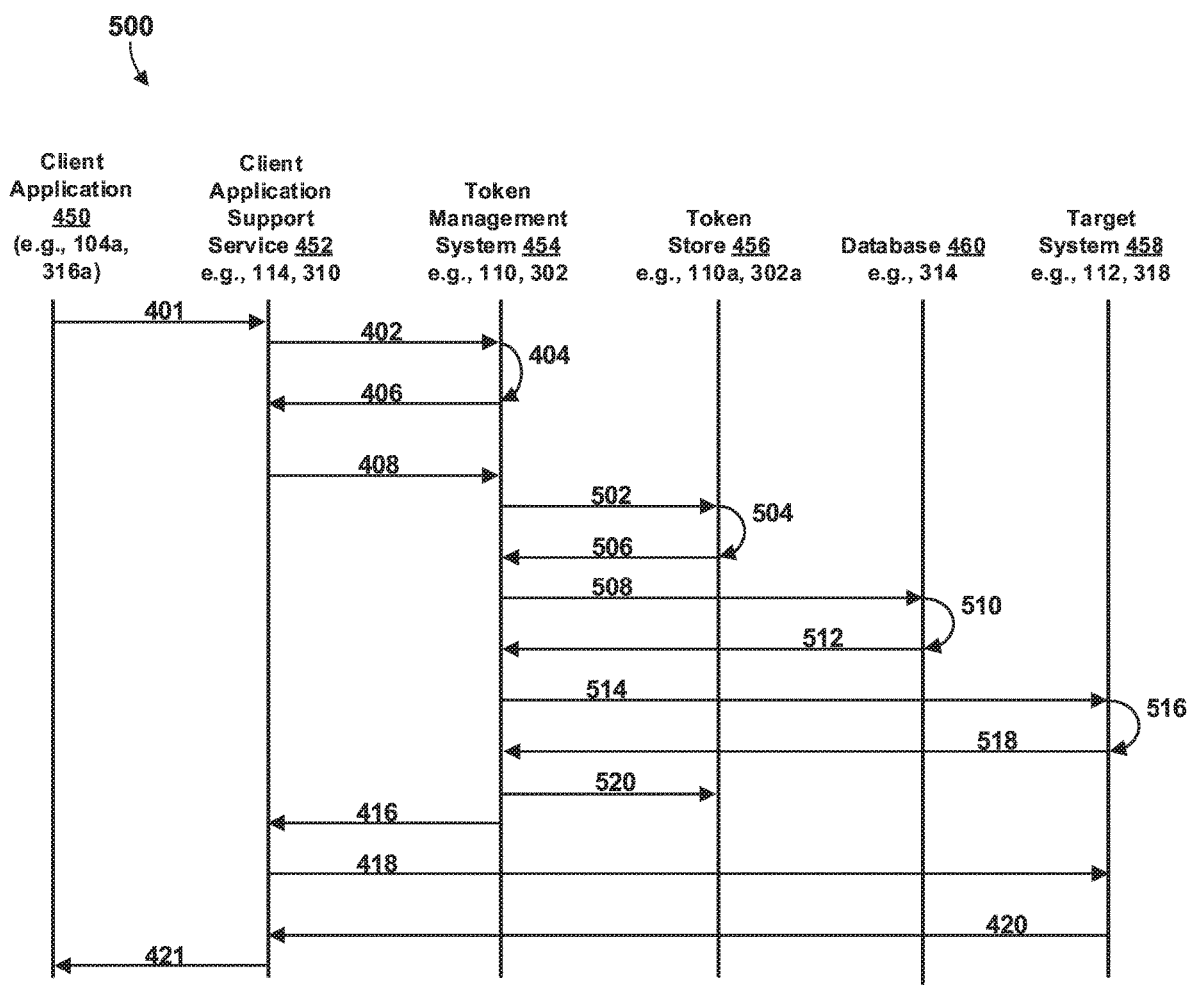

FIG. 5 is a message flow diagram illustrating a method 500 for management of access credentials according to various embodiments. With reference to FIGS. 1-5, the method 500 illustrates a scenario in which client application support service 452 requests an access token for the target system 458 on behalf of the client application 450, but the token has not yet been created for the client application 450 with respect to the target system 458.

As discussed above, the client application 450 may send a request 401 for information from the target system 458 to the client application support service 452. The client application support service 452 may send an authentication request 402 to a token management system (e.g., 302) to authenticate with the token management system 454. The token management system 454 may perform authentication operations 404, and may return a response 406 including a notification that an authentication token for the client application 450 is not available and that a token request must be initiated.

The client application support service 452 may send a token request 408 to the token management system 454. The token management system 454 may send a query 502 to a token store 456 to determine whether an access token for the target system 458 is stored in the token store 456 in operation 504. In this scenario, the access token has not yet been created for the client application 450 with respect to the target system 458. In response to determining that the access token is not stored in token store 456 (i.e., in response to determining that the token has not been generated for the client application 450 with respect to the target system 458), the token store 456 may send a message 506 to the token management system 454 indicating that the access token is not available (i.e., has not been generated or found).

In response to the indication that the access token is not found in the token store 456, the token management system 454 may send a request 508 to a database 460 (e.g., the data store 314) for credentials of the client application 310. The database 460 may obtain credentials for the client application 450 in operation 510. The database 460 may then send a message 512 including the credentials to the token management system 454.

The token management system 454 may send an authentication request 514 to the target system 458 including or using the credentials of the client application 450. The target system 458 may generate an access token associated with the client application 450 (e.g., based on the client application credentials) for the target system 458 in operation 516. The target system 458 may send a message 518 including the generated access token to the token management system 454. In some embodiments, the token management system 454 may send a message 520 including the generated access token to the token store 456 for storage. The token management system 302 may send the message 416 including the generated access token to the client application support service 452, which the client application support service 452 may use in interacting with the target system 458.

Figure 6:
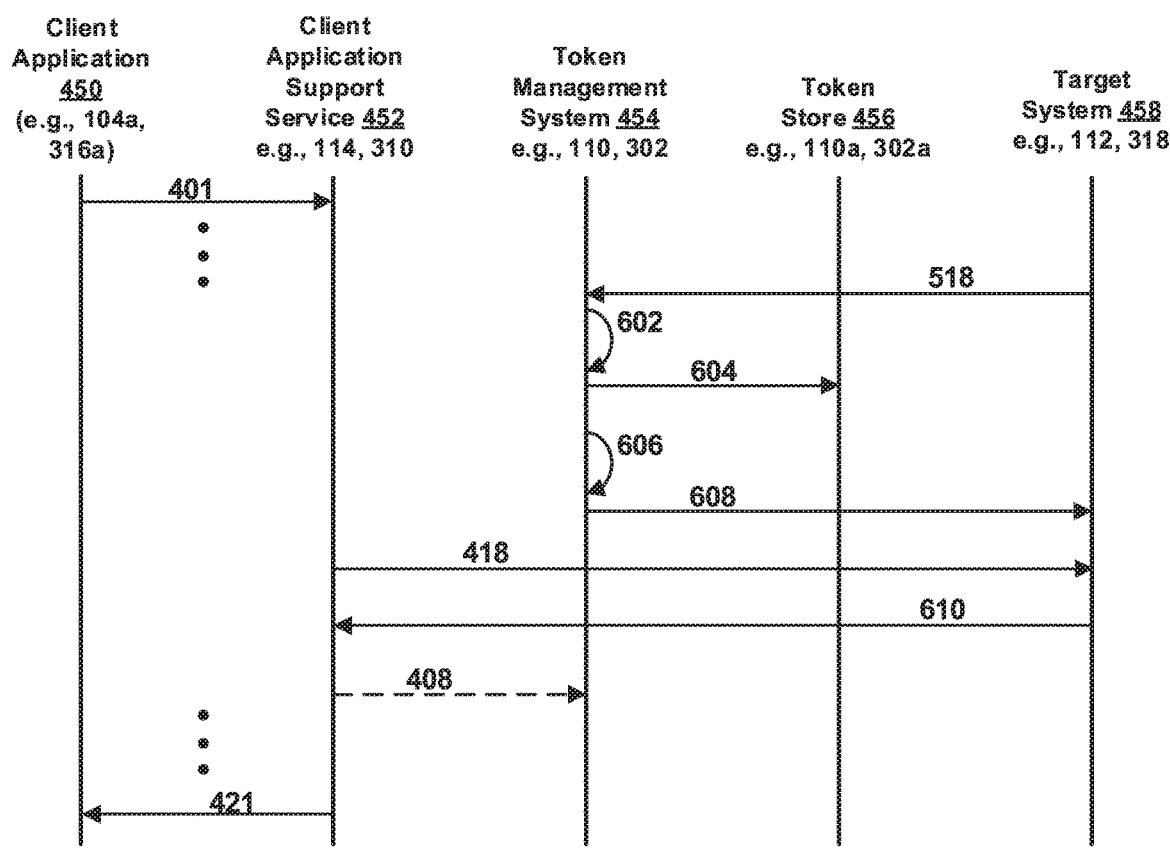

FIG. 6 is a message flow diagram illustrating a method 600 for management of access credentials according to various embodiments. With reference to FIGS. 1-6, the method 600 illustrates a scenario in which a time to live (TTL) value of an access token has expired.

In some embodiments, the token management system 454 may receive (e.g., 518) an access token from the target system 458 (e.g., via the credential management API 312) as described.

The token management system 456 may assign a TTL to the access token in operation 602. For example, the token management system 456 may determine or generate the TTL and may associate the TTL with the access token. The token management system 454 may send a message 604 including the access token to the token store 456 for storage. The token management system 454 may thereafter monitor the TTL of the access token to determine whether the TTL has expired.

In operation 606, the token management system 454 may determine that the TTL of the access token has expired. In various embodiments, the expired access token may not be used by client application support service 452 to access the target system 458. In some embodiments, the token management system 454 may send a message 608 to the target system 458 indicating that the TTL associated with the access token has expired.

In some embodiments, in response to the call message 418 (e.g., a request for access, a request for information, or another suitable message, see FIG. 4) that uses the now-expired token, the target system 458 may send a message 610 to the client application indicating that the TTL of the access token has expired. In some embodiments, the message 610 may include message indicating access failure to the target system 458. In some embodiments, the target system 458 may proactively send the message 610 to notify the client application support service 452 of the expiration of the token's TTL. In some embodiments, the token management system 454 may be provided with an API in a designated format, such as a representational state transfer (REST) API, to facilitate the monitoring of and/or expiration of TTLs associated with access tokens.

In some embodiments, the client application support service 452 may subsequently send a token request (e.g., 408) to the token management system 454 to request a new access token, substantially as described.

Figure 7:
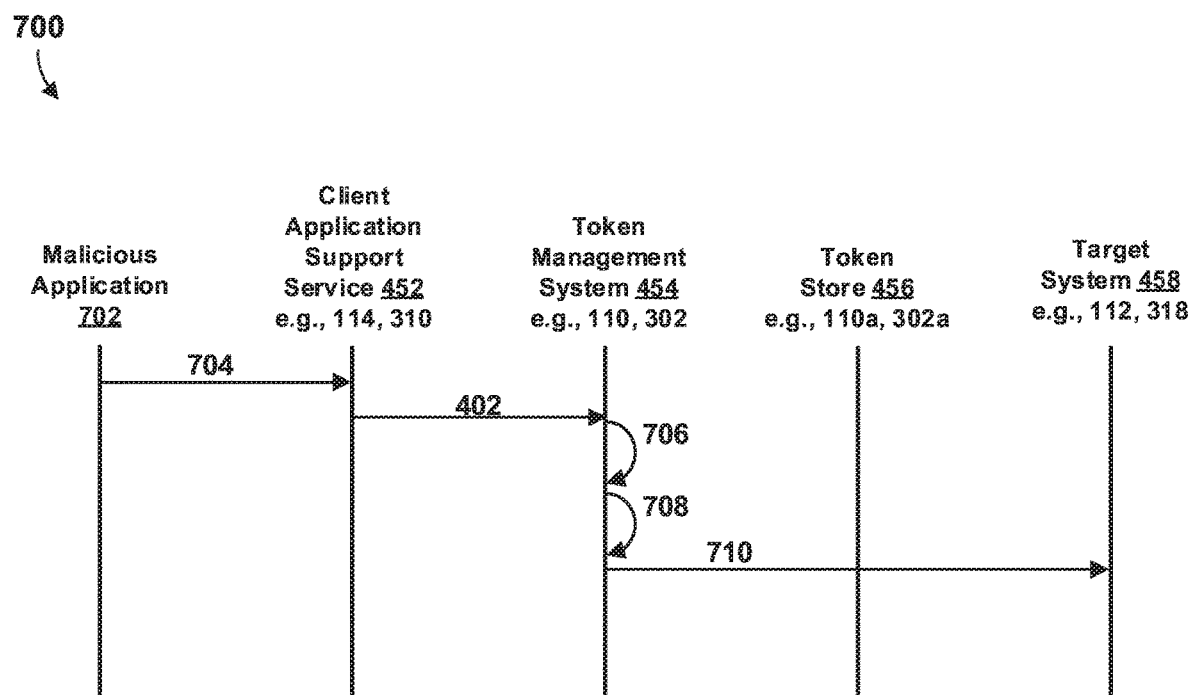

FIG. 7 is a message flow diagram illustrating a method 700 for management of access credentials according to various embodiments. With reference to FIGS. 1-7, the method 700 illustrates security functions of the token management system 454. In some embodiments, the method 700 may be implemented in a client application backend support service.

In various embodiments, the token management system 454 may manage tokens to perform defensive operations in response to the detection of a compromised token and/or compromised credentials.

A malicious application 702 may send a request 704 for information from the target system 458 to the client application support service 452. The client application support service 452 may send an authentication request 402 to the token management system 454 to authenticate the malicious application 702 with the token management system 454.

In various embodiments, the token management system 454 may determine that a credential or a token has been compromised or is invalid. For example, the token management system 454 may determine that the malicious application is unauthorized to access the target system 458. In some embodiments, the token management system 454 may receive an indication that the credential or token has been compromised or is invalid from a network security function (not illustrated) in communication with the token management system 454. In some embodiments, the token management system 454 may determine (operation 706) that a credential associated with the client application, or an authentication token, or an access token been compromised or is invalid in response to the request 704 received from the malicious application 702. In some embodiments, the token management system 454 may determine that a credential or a token has been compromised or is invalid in response to a notification from the network security function.

In some embodiments, in response to determining that the credential or token has been compromised or is invalid, the token management system 454 may perform a security operation 708. In some embodiments, the token management system 454 may expire or deactivate the credential or token. In some embodiments, the token management system 454 may expire or deactivate all tokens or certificates associated with the target system 458 for the legitimate device (e.g., 316, 102, 104, 106) or legitimate application (e.g., 104a, 316a, 450), for example, on the presumption that the legitimate device or application has been compromised. In some embodiments, the token management system 454 may store new access tokens received from the target system 458 and not provide new tokens to the application support service 452.

In some embodiments, the token management system 454 may send a notification 710 to the target system 458 indicating that the credential or token has been compromised or is invalid, or indicating that the token management system 454 has performed the security operation 708. In response to the message 710, the target system 458 may stop issuing access tokens for a period of time.

Figure 8:
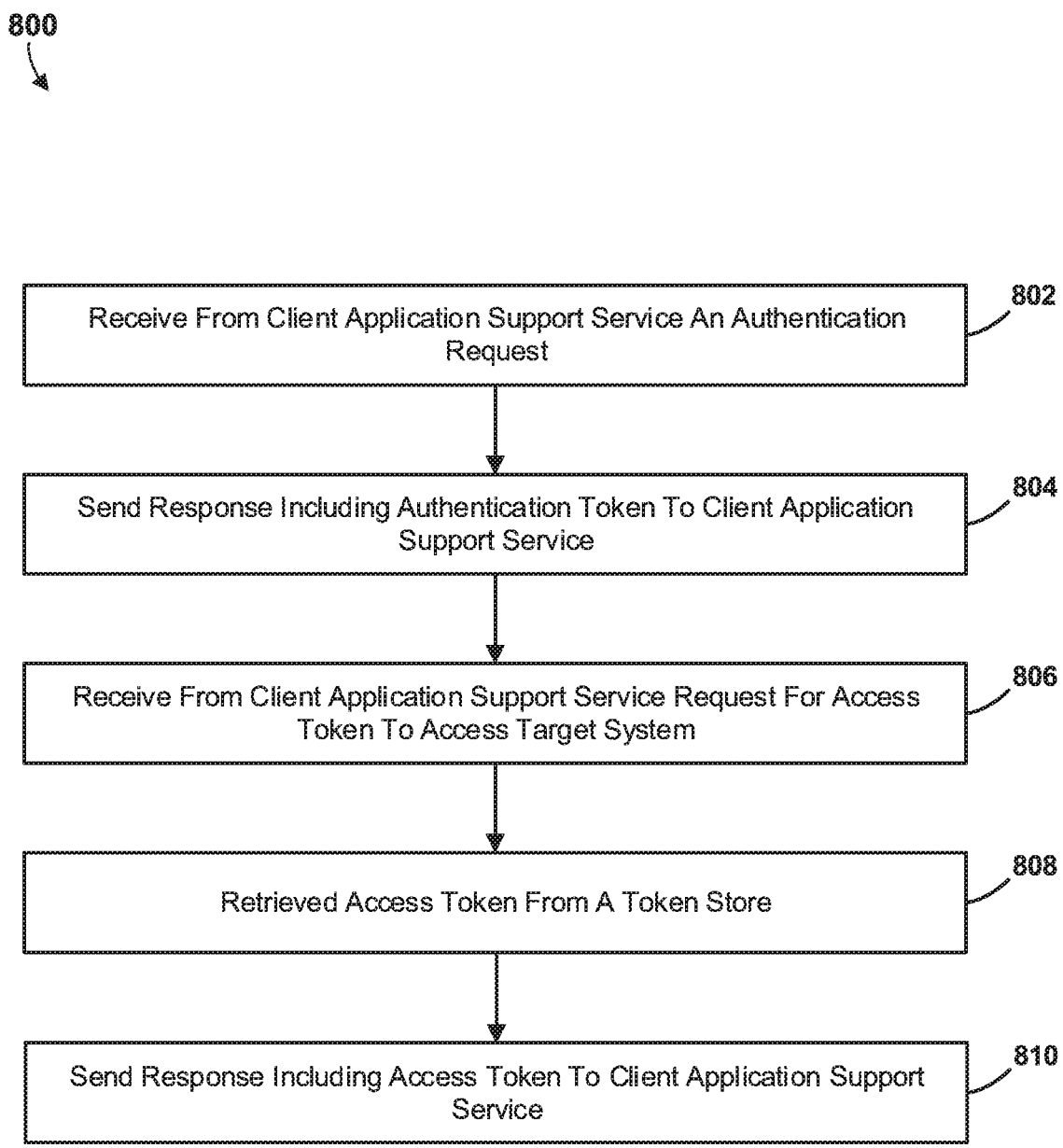
FIGS. 8-12 are process flow diagrams illustrating methods for management of access credentials according to various embodiments.

FIG. 8 is a process flow diagram illustrating a method 800 for management of access credentials according to various embodiments. With reference to FIGS. 1-8, the operations of the method 800 may be implemented in hardware components and/or software components of a computing device (e.g., the computing device 110) the operation of which may be controlled by one or more processors (e.g., the processor 201 and/or the like).

In block 802, the computing device processor may receive from a client application support service (e.g., 310, 452) an authentication request (e.g., 402).

In block 804, the computing device processor may send a response (e.g., 406) including an authentication token to the client application support service.

In block 806, the computing device processor may receive from the client application support service a request (e.g., 502) for an access token to access a target system (e.g., 112, 318, 458).

In block 808, the computing device processor may retrieve the access token from a token store (e.g., 302a, 456).

In some embodiments, the token store may be implemented in a memory 202, 203, 204 of the computing device.

In block 810, the computing device processor may send a response (e.g., 416) including the access token to the client application support service. In some embodiments, the access token may enable the client application support service to access the target system.

Figure 9:
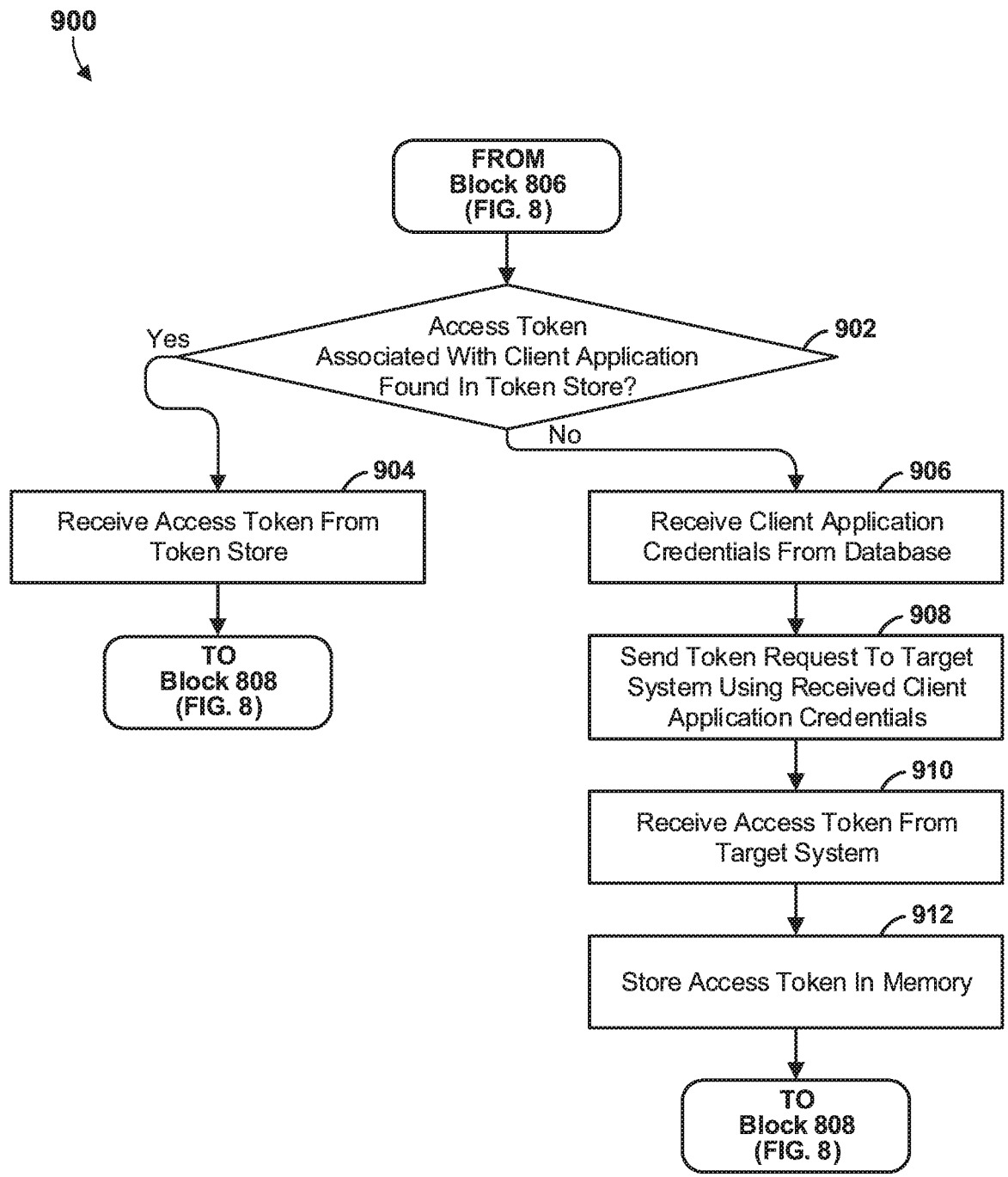

FIG. 9 is a process flow diagram illustrating a method 900 for management of access credentials according to various embodiments. With reference to FIGS. 1-9, the operations of the method 900 may be implemented in hardware components and/or software components of a computing device (e.g., the computing device 110) the operation of which may be controlled by one or more processors (e.g., the processor 201 and/or the like).

Following the operations of in block 806 (FIG. 8), the computing device processor may determine whether an access token associated with the client application (e.g., 104a, 316a, 450) has been found in the token store (e.g., 110a, 302a, 456) in determination block 902.

In response to determining that the access token associated with the client application is found (i.e., determination block 902="Yes"), the computing device processor may receive the access token from the token store in block 904.

The computing device processor may then proceed to perform the operations of block 808 (FIG. 8) as described.

In response to determining that the access token associated with the client application is not found (i.e., determination block 902="No"), the computing device processor may receive client application credentials from a database (e.g., 314) in block 906. In some embodiments, the computing device processor may send a request for, or retrieve, the client application credentials from the database.

In block 908, the computing device processor may send a token request (e.g., 514) to the target system (e.g., 112, 318, 458) using the received client application credentials.

In block 910, the computing device processor may receive the access token (e.g., message 518) from the target system.

In block 912, the processor may store the access token (e.g., message 520) in a memory of the computing device.

The processor may then proceed to perform the operations of block 808 (FIG. 8) as described.

Figure 10:
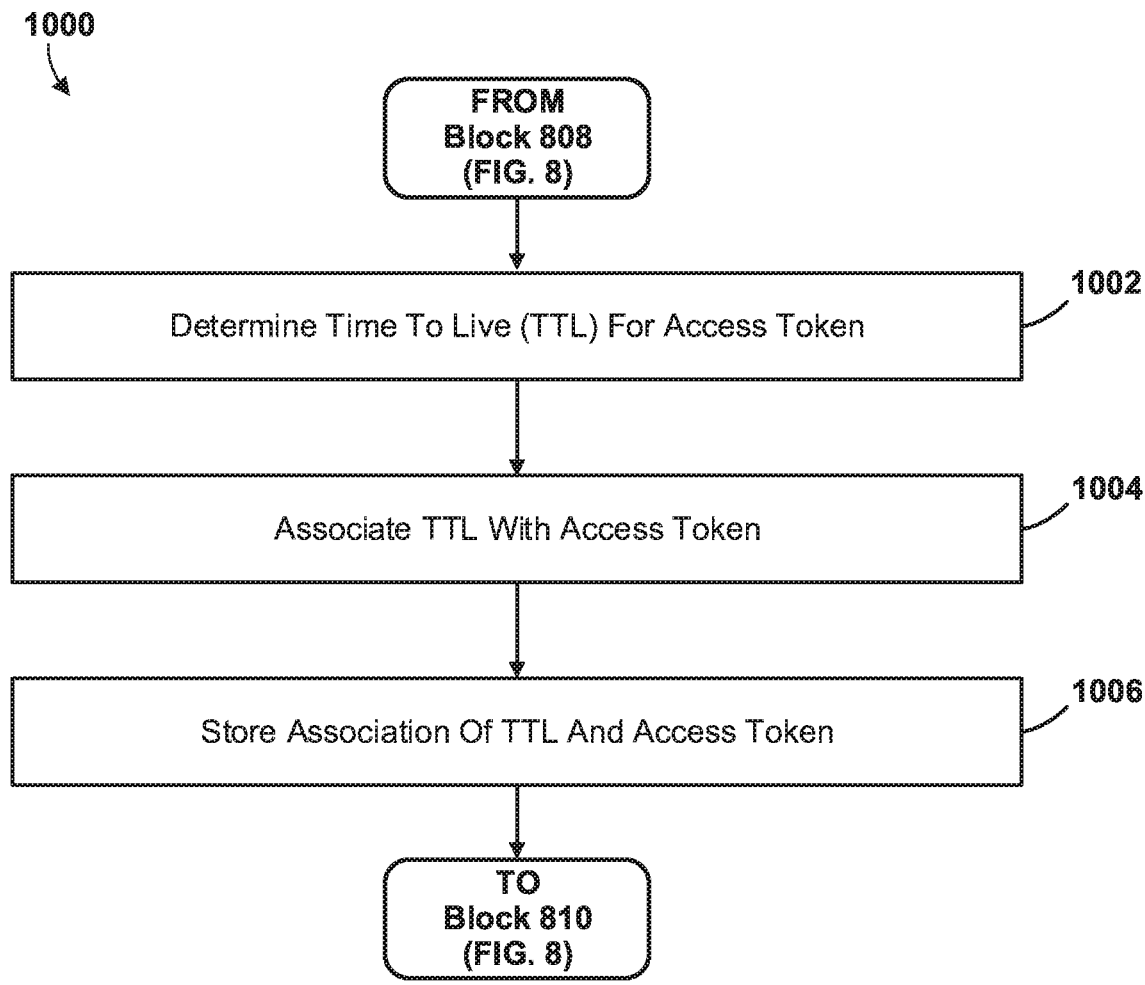

FIG. 10 is a process flow diagram illustrating a method 1000 for management of access credentials according to various embodiments. With reference to FIGS. 1-10, the operations of the method 1000 may be implemented in hardware components and/or software components of a computing device (e.g., the computing device 110) the operation of which may be controlled by one or more processors (e.g., the computing device processor 201 and/or the like).

In block 1002, following the operations of block 808 (FIG. 8), the computing device processor may determine a time to live (TTL) for the access token.

In block 1004, the computing device processor may associate the TTL with the access token.

In block 1006, the computing device processor may store the association of the TTL in the access token.

The computing device processor may then proceed to perform the operations of block 810 (FIG. 8) as described.

Figure 11:
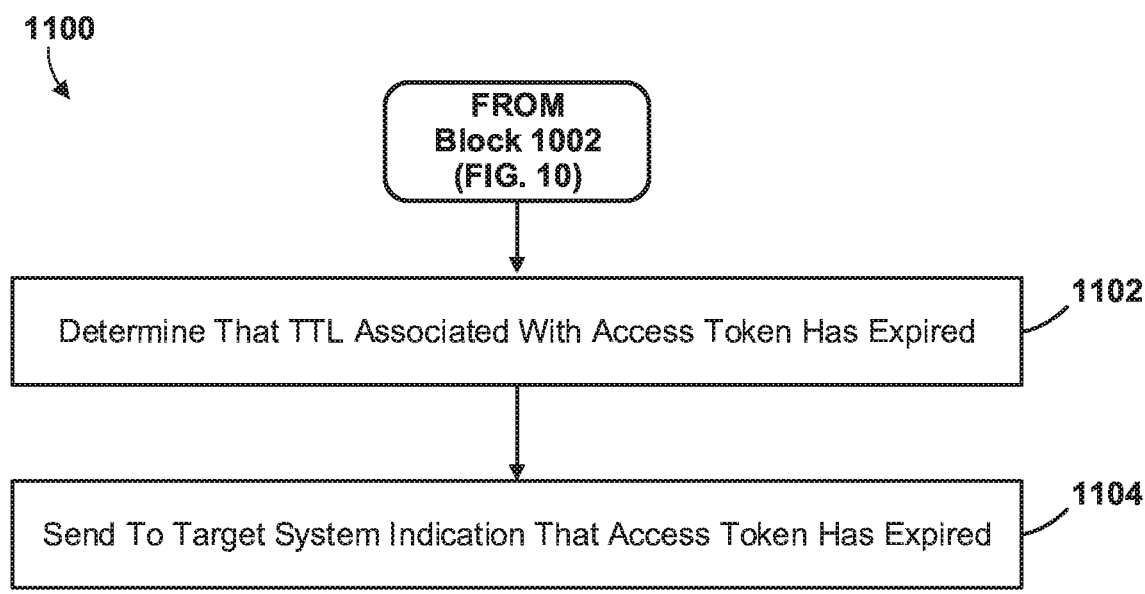

FIG. 11 is a process flow diagram illustrating a method 1100 for management of access credentials according to various embodiments. With reference to FIGS. 1-11, the operations of the method 1100 may be implemented in hardware components and/or software components of a computing device (e.g., the computing device 110) the operation of which may be controlled by one or more processors (e.g., the processor 201 and/or the like).

Following the operations of block 1002 (FIG. 10), the computing device processor may determine that a TTL associated with an access token has expired in block 1102. In some embodiments, the computing device processor may monitor the TTL associated with the access token, and periodically or from time to time may determine whether the TTL has expired.

In block 1104, the computing device processor may send to the target system an indication that the access token has expired. For example, the computing device processor may send a message (e.g., 608) to the target system indicating that the TTL associated with the access token has expired. Additionally or alternatively, in some embodiments the computing device processor may send a message to the client application indicating that the TTL associated with the access token has expired.

Figure 12:
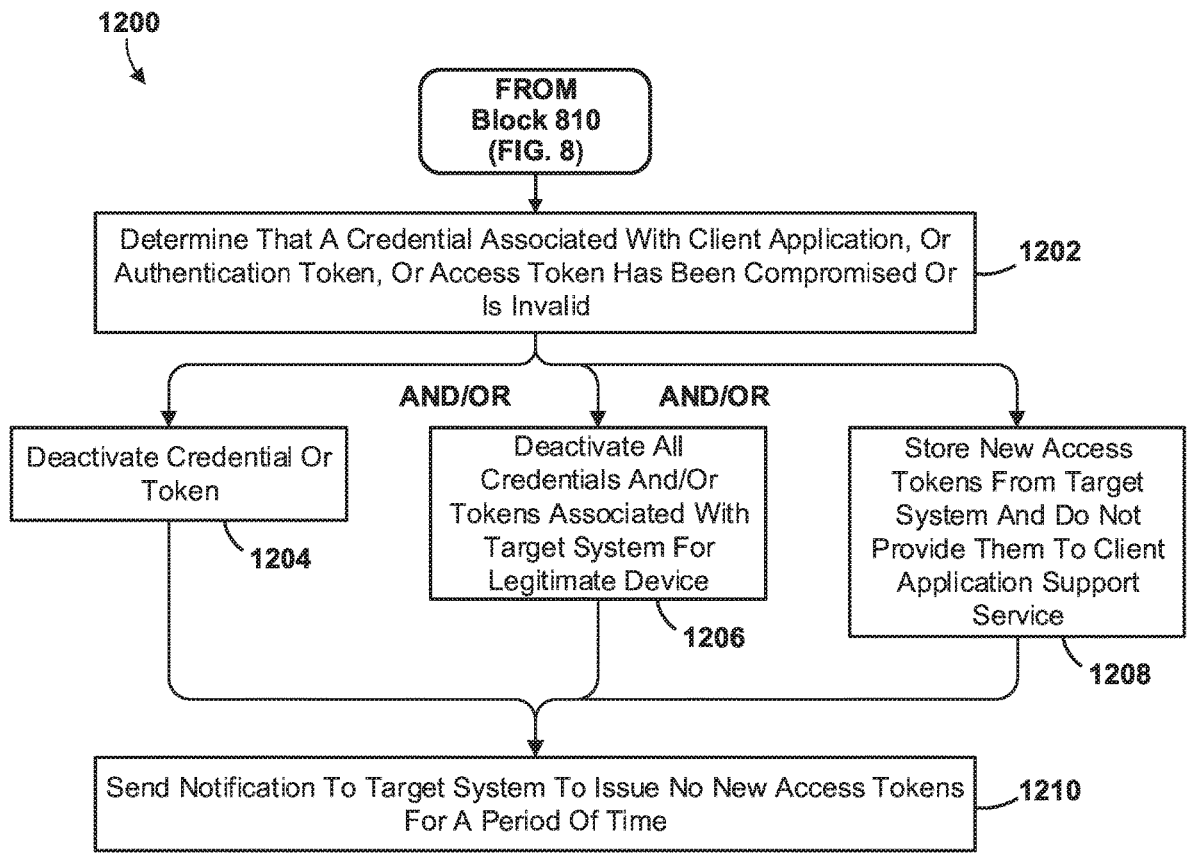

FIG. 12 is a process flow diagram illustrating a method 1200 for management of access credentials according to various embodiments. With reference to FIGS. 1-12, the operations of the method 1200 may be implemented in hardware components and/or software components of a computing device (e.g., the computing device 110) the operation of which may be controlled by one or more processors (e.g., the processor 201 and/or the like).

Following the operations of block 810 (FIG. 8), the computing device processor may determine that a credential or a token has been compromised or is invalid in block 1202.

In response to determining that the credential or token has been compromised or is invalid, the computing device processor may perform one or more security operations.

In some embodiments, the computing device processor may deactivate the credential or token in block 1204. Additionally or alternatively, in some embodiments, the computing device processor may deactivate all tokens or certificates associated with the target system (e.g., 112, 318, 458) for the legitimate device (e.g., 316, 102, 104, 106) or legitimate application (e.g., 104a, 316a, 450). Additionally or alternatively, in some embodiments, the computing device processor may store new access tokens received from the target system and not provide new tokens to the client application support service, to prevent new tokens from being issued to a malicious device or application, or to a legitimate device or application that has been compromised.

In block 1210, the computing device processor may send a notification to the target system to issue no new access tokens for a period of time. For example, the computing device processor may send a notification to the target system indicating that the credential or token has been compromised or is invalid, or indicating that the token management system has performed the security operation(s). In response to the notification, the target system may stop issuing access tokens for a period of time.

Various embodiments may be implemented to provide a token management service. Various embodiments may be implemented to provide a framework that enables a client application support service to be integrated with the token management service. In some embodiments, the framework may provide an interface for making authenticated requests that automatically acquires an authentication token, refreshes the authentication token if needed, and may include the authentication token in requests (e.g., to source system APIs). In such embodiments, a client application support service that integrates with a source system API may be implemented to utilize the token management service. In some implementations, the framework may provide such functions or functional components as: a configurable client to make requests and parse requests from a token management system API; a component to store tokens (e.g., from the token management system) for re-use across multiple requests; a component to automatically refresh a token in response to determining that the token has expired or is invalid; and/or a component to tokens from the token management system in requests to source system APIs.

Figure 13:
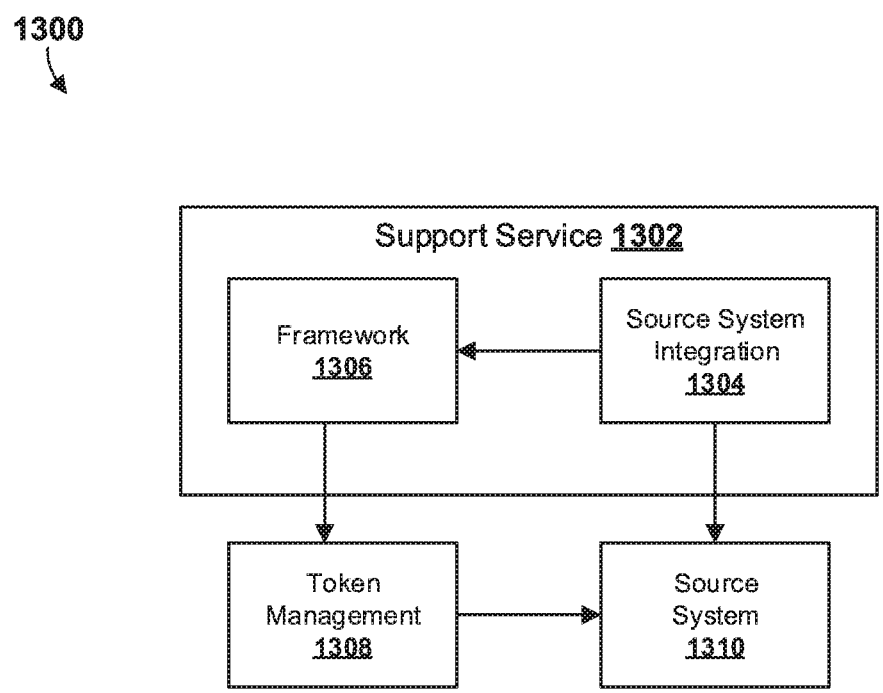
FIG. 13 illustrates a support service on framework suitable for implementing various embodiments.

FIG. 13 illustrates a support service on framework 1300 suitable for implementing various embodiments. With reference to FIGS. 1-13, a support service 1302 may include a source system integration 1304 that interfaces with a source system 1310 (e.g., the target system 112, 318, 458) and with a framework 1306 to make authenticated requests for use with the source system 1310. The framework 1306 may interface with a token management system 1308 (e.g., 110, 302, 454) which may function substantially as described.

Figure 14:
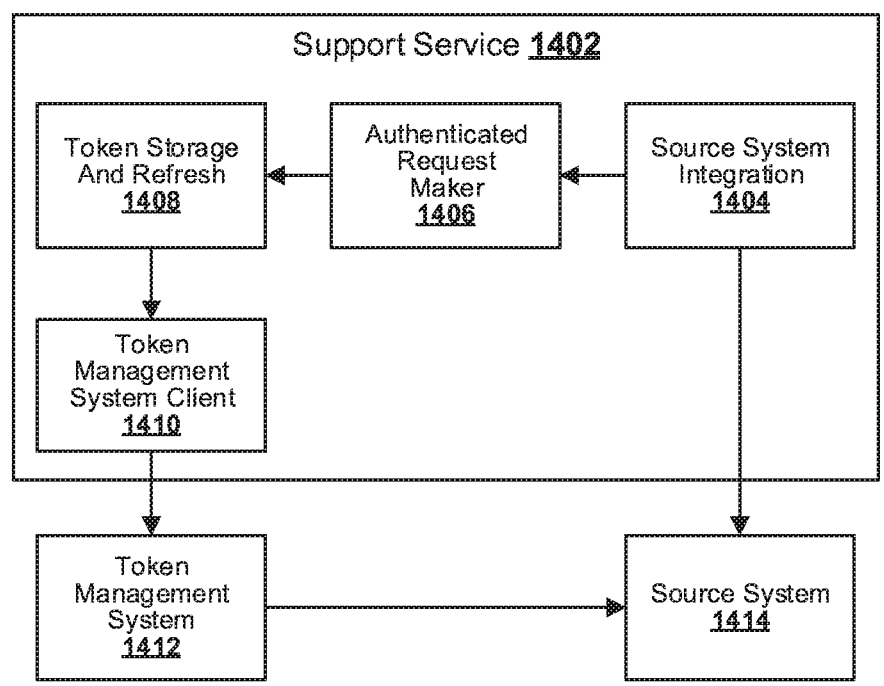
FIG. 14 illustrates a support service built with its own integration suitable for implementing various embodiments.

FIG. 14 illustrates a support service 1400 built with its own integration suitable for implementing various embodiments. With reference to FIGS. 1-14, a support service 1402 built separately from a framework may include a source system integration 1404 that interfaces with a source system 1414 (e.g., the target system 112, 318, 458) and with an authenticated request maker 1406. The authenticated request maker 1406 may communicate with a token storage and refresh function 1408 that may store a received token and may request a new token (e.g., refresh the token) in response to determining that the token has expired or is invalid. The token storage and refresh function 1408 may communicate with a token management system client 1410 that communicates with a token management system 1412 (e.g., 110, 302, 454), which may function substantially as described. In some embodiments, the authenticated request maker 1406 may make authenticated requests that include tokens provided by the token management system 1412.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations, or operations of the methods 400-1200 may be substituted for or combined with one or more operations of the methods 400-1200 and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a computing device for management of access credentials, comprising:
   receiving, from a client application support service, an authentication request to authenticate a client application;
   sending a response comprising an authentication token to the client application support service to authenticate the client application;
   receiving, from the client application support service, a request for an access token to access a target system;
   determining whether an access token that is associated with the client application is found in a token store in response to the received request from the client application support service for the access token;
   receiving client application credentials from a database in response to determining that the access token that is associated with the client application is not found;
   sending to the target system a token request using the received client application credentials;
   receiving from the target system an access token in response to the token request using the received client application credentials; and
   sending a response comprising the access token to the client application support service to enable the client application support service to access the target system using the access token on behalf of the client application.

2. The method of claim 1, further comprising
   receiving the access token from the token store in response to determining that the access token that is associated with the client application is found.

3. The method of claim 1, wherein sending a response comprising the access token to the client application support service to enable the client application support service to access the target system including the access token on behalf of the client application comprises:
   sending a response comprising the access token received from the target system to the client application support service.

4. The method of claim 1, wherein the authorization request comprises a username and a password.

5. The method of claim 1, further comprising retrieving from a token store the access token in response to the received request from the client application support service for the access token.

6. The method of claim 1, further comprising determining a time to live (TTL) for the access token and associating the TTL with the access token.

7. The method of claim 6, further comprising:
   determining that the TTL associated with the access token has expired; and
   sending to the target system an indication that the access token has expired.

8. The method of claim 1, further comprising:
   determining that a credential associated with the client application, the authentication token, or the access token has been compromised; and
   performing a security operation in response to determining that the credential associated with the client application, the authentication token, or the access token has been compromised.

9. A computing device, comprising:
a communication interface; and
a processor coupled to the memory and configured with processor-executable instructions to perform operations comprising:
  receiving, from a client application support service, an authentication request to authenticate a client application;
  sending a response comprising an authentication token to the client application support service to authenticate the client application;
  receiving, from the client application support service, a request for an access token to access a target system;
  determining whether an access token that is associated with the client application is found in a token store in response to the received request from the client application support service for the access token;
  receiving client application credentials from a database in response to determining that the access token that is associated with the client application is not found;
  sending to the target system a token request using the received client application credentials;
  receiving from the target system an access token in response to the token request using the received client application credentials; and
  sending a response comprising the access token to the client application support service to enable the client application support service to access the target system using the access token on behalf of the client application.

10. The computing device of claim 9, wherein the processor is configured with processor-executable instructions to perform operations further comprising
  receiving the access token from the token store in response to determining that the access token that is associated with the client application is found.

11. The computing device of claim 10, wherein the processor is configured with processor-executable instructions to perform operations such that sending a response comprising the access token to the client application support service to enable the client application support service to access the target system including the access token on behalf of the client application comprises:
  sending a response comprising the access token received from the target system to the client application support service.

12. The computing device of claim 9, wherein the processor is configured with processor-executable instructions to perform operations such that the authorization request comprises a username and a password.

13. The computing device of claim 9, wherein the processor is configured with processor-executable instructions to perform operations further comprising retrieving from a token store the access token in response to the received request from the client application support service for the access token.

14. The computing device of claim 9, wherein the processor is configured with processor-executable instructions to perform operations further comprising: determining a time to live (TTL) for the access token and associating the TTL with the access token.

15. The computing device of claim 14, wherein the processor is configured with processor-executable instructions to perform operations further comprising:
  determining that the TTL associated with the access token has expired; and
  sending to the target system an indication that the access token has expired.

16. The computing device of claim 9, wherein the processor is configured with processor-executable instructions to perform operations further comprising:
  determining that a credential associated with the client application, the authentication token, or the access token has been compromised; and
  performing a security operation in response to determining that the credential associated with the client application, the authentication token, or the access token has been compromised.

17. A non-transitory processor-readable medium having stored thereon processor-executable instruction configured to cause a processing device in a computing device to perform operations comprising:
  receiving, from a client application support service, an authentication request to authenticate a client application;
  sending a response comprising an authentication token to the client application support service to authenticate the client application;
  receiving, from the client application support service, a request for an access token to access a target system;
  determining whether an access token that is associated with the client application is found in a token store in response to the received request from the client application support service for the access token;
  receiving client application credentials from a database in response to determining that the access token that is associated with the client application is not found;
  sending to the target system a token request using the received client application credentials;
  receiving from the target system an access token in response to the token request using the received client application credentials; and
  sending a response comprising the access token to the client application support service to enable the client application support service to access the target system using the access token on behalf of the client application.

18. The non-transitory processor-readable medium of claim 17, wherein the stored processor-executable instructions are configured to cause a processor of a wireless device to perform operations further comprising
  receiving the access token from the token store in response to determining that the access token that is associated with the client application is found.

19. The non-transitory processor-readable medium of claim 17, wherein the stored processor-executable instructions are configured to cause a processor of a wireless device to perform operations such that sending a response comprising the access token to the client application support service to enable the client application support service to access the target system including the access token on behalf of the client application comprises:
  sending a response comprising the access token received from the target system to the client application support service.

20. The non-transitory processor-readable medium of claim 17, wherein the stored processor-executable instructions are configured to cause a processor of a wireless device to perform operations such that the authorization request comprises a username and a password.

21. The non-transitory processor-readable medium of claim 17, wherein the stored processor-executable instructions are configured to cause a processor of a wireless device to perform operations further comprising retrieving from a token store the access token in response to the received request from the client application support service for the access token.

22. The non-transitory processor-readable medium of claim 17, wherein the stored processor-executable instructions are configured to cause a processor of a wireless device to perform operations further comprising determining a time to live (TTL) for the access token and associating the TTL with the access token.

23. The non-transitory processor-readable medium of claim 22, wherein the stored processor-executable instructions are configured to cause a processor of a wireless device to perform operations further comprising:
   determining that the TTL associated with the access token has expired; and
   sending to the target system an indication that the access token has expired.

24. The non-transitory processor-readable medium of claim 17, wherein the stored processor-executable instructions are configured to cause a processor of a wireless device to perform operations further comprising:
   determining that a credential associated with the client application, the authentication token, or the access token has been compromised; and
   performing a security operation in response to determining that the credential associated with the client application, the authentication token, or the access token has been compromised.

* * * * *